United States Patent [19]

Sugawara et al.

[11] Patent Number: 5,513,121
[45] Date of Patent: Apr. 30, 1996

[54] OPTICAL HEAD

[75] Inventors: Ken Sugawara; Masaaki Komiya, both of Tokyo, Japan

[73] Assignee: Olympus Optical Co., Ltd., Japan

[21] Appl. No.: 173,910

[22] Filed: Dec. 27, 1993

[30] Foreign Application Priority Data

Jan. 11, 1993 [JP] Japan ................................. 5-002760
Feb. 8, 1993 [JP] Japan ................................. 5-020159
Apr. 6, 1993 [JP] Japan ................................. 5-103522

[51] Int. Cl.$^6$ ................................................. G11B 7/135
[52] U.S. Cl. ........................... 369/44.14; 369/44.37; 369/44.39; 369/44.11; 369/44.12; 369/112
[58] Field of Search ............................. 369/112, 44.14, 369/44.37, 44.39, 44.11, 44.12, 112

[56] References Cited

U.S. PATENT DOCUMENTS 5,063,548 11/1991 Yamashita et al. ................. 369/44.14
5,311,489 5/1994 Suzuki et al. ...................... 369/44.14
5,319,624 6/1994 Yamasaki et al. .................. 369/44.14

FOREIGN PATENT DOCUMENTS 2-257432 10/1990 Japan .
3-165338 7/1991 Japan .
3-80523 8/1991 Japan .
3-254448 11/1991 Japan .

*Primary Examiner*—Viet Q. Nguyen
*Attorney, Agent, or Firm*—Laff, Whitesel, Conte & Saret, Ltd.

[57] ABSTRACT

An optical head has a stationary optical system and a movable optical system. The stationary optical system includes a semiconductor laser located in a holding member with an opening, and a beam splitter for guiding light emitted from the light source, to the outside of the holding member through the opening. The sheet member contacts both the beam splitter and that portion of the holding member which surrounds the opening thereof, thereby sealing the opening. Further, the holding member is movably secured to the frame of the movable optical system.

3 Claims, 14 Drawing Sheets

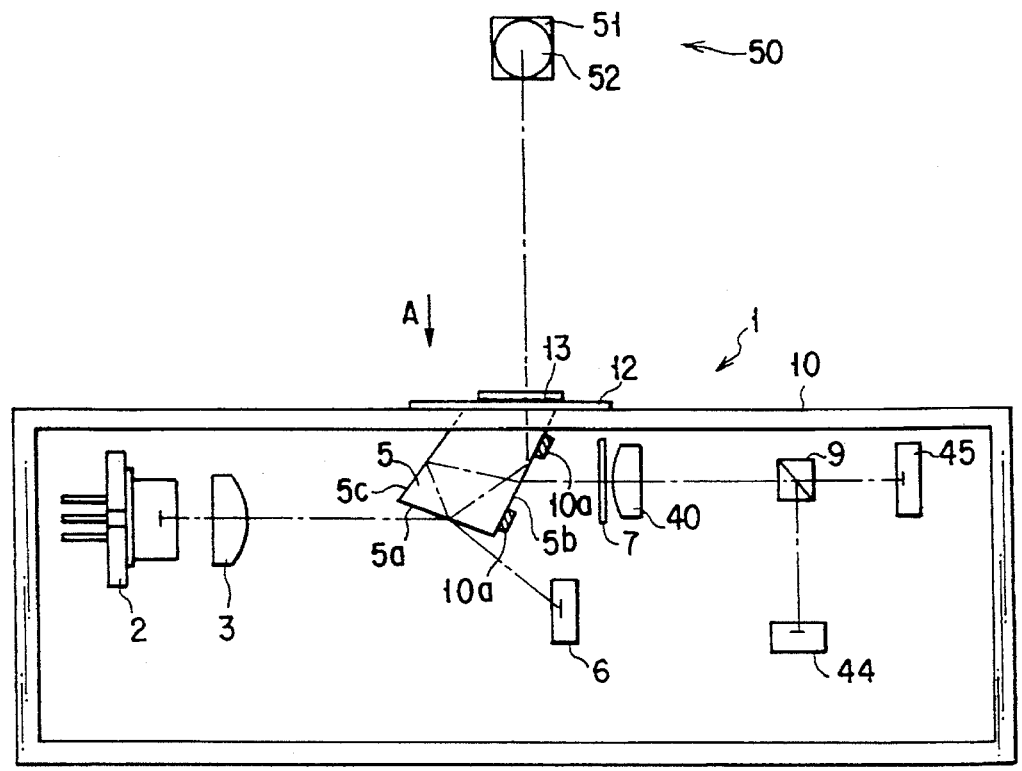
F I G. 1
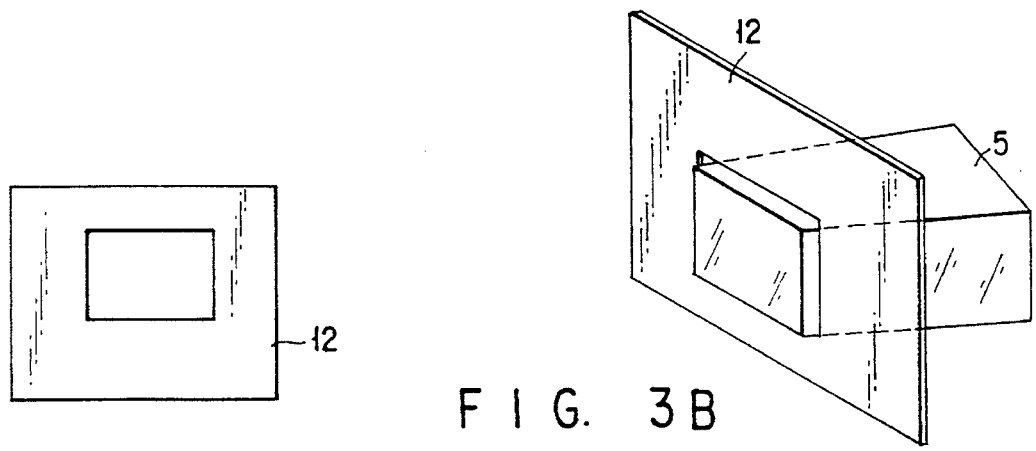
F I G. 3A
F I G. 3B
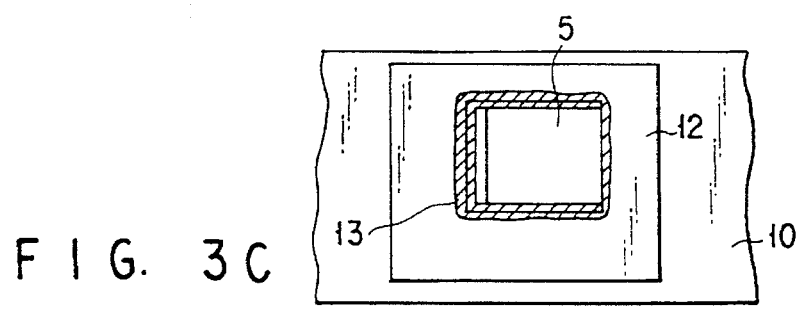
F I G. 3C

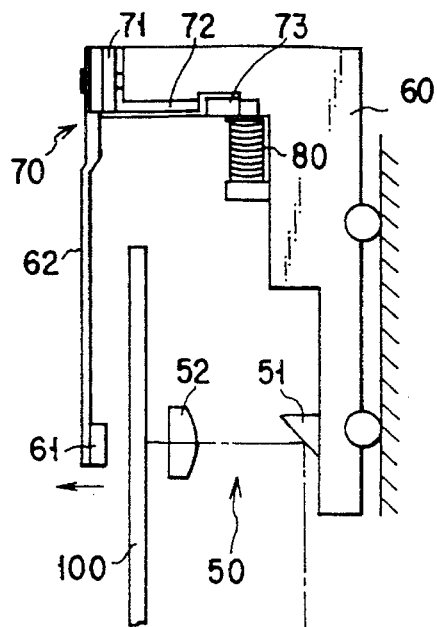
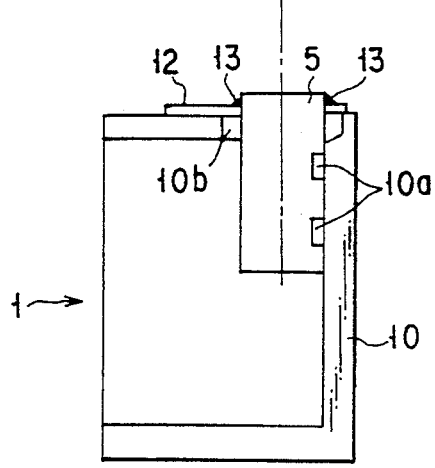
F I G. 2
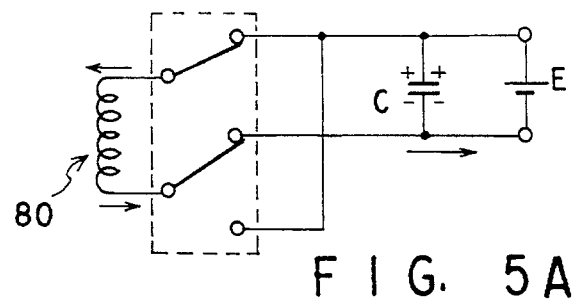
F I G. 5A
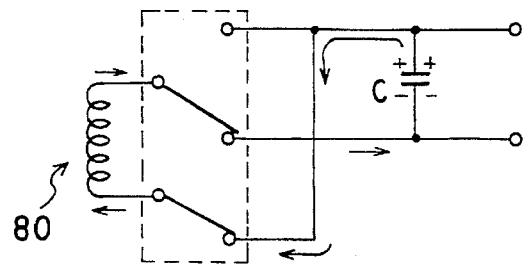
F I G. 5B
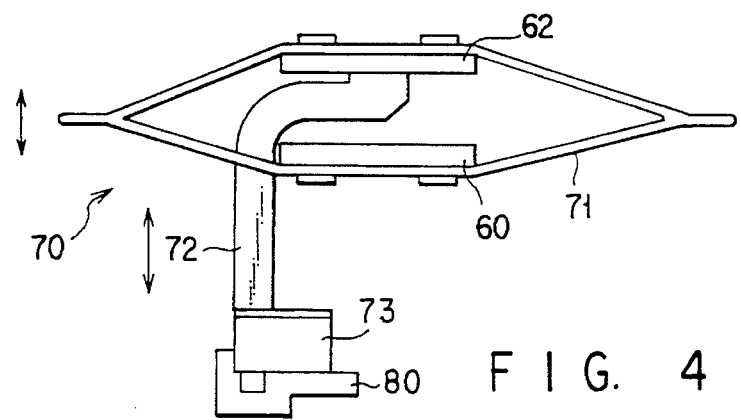
F I G. 4

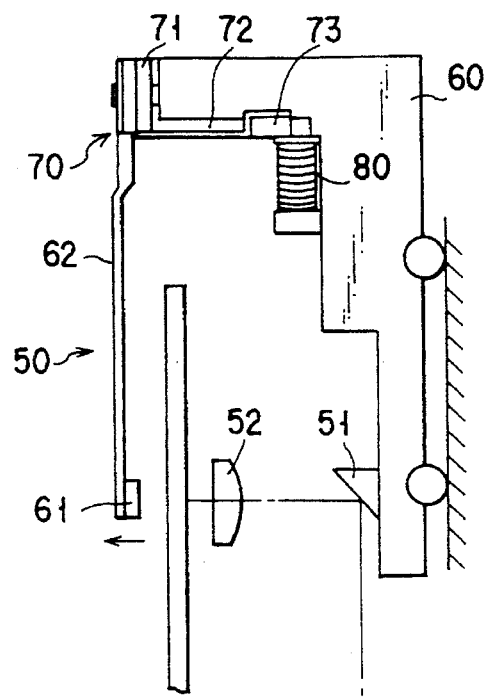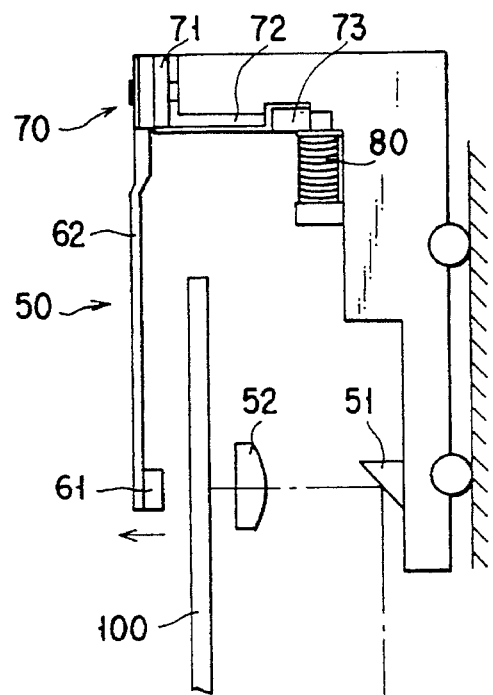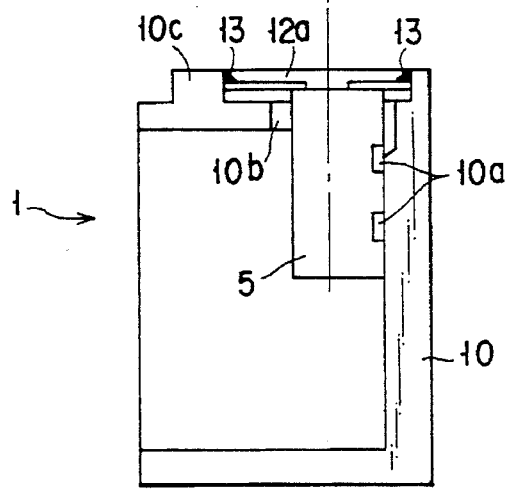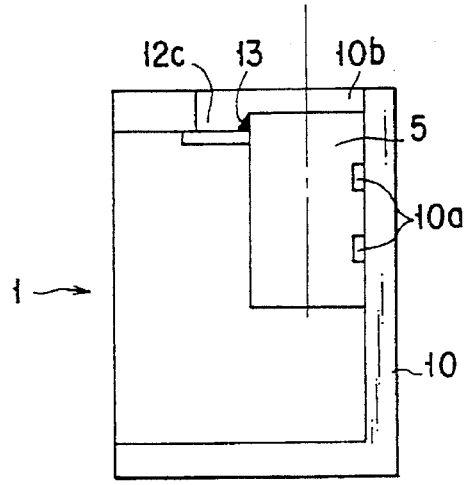
F I G. 7	F I G. 10

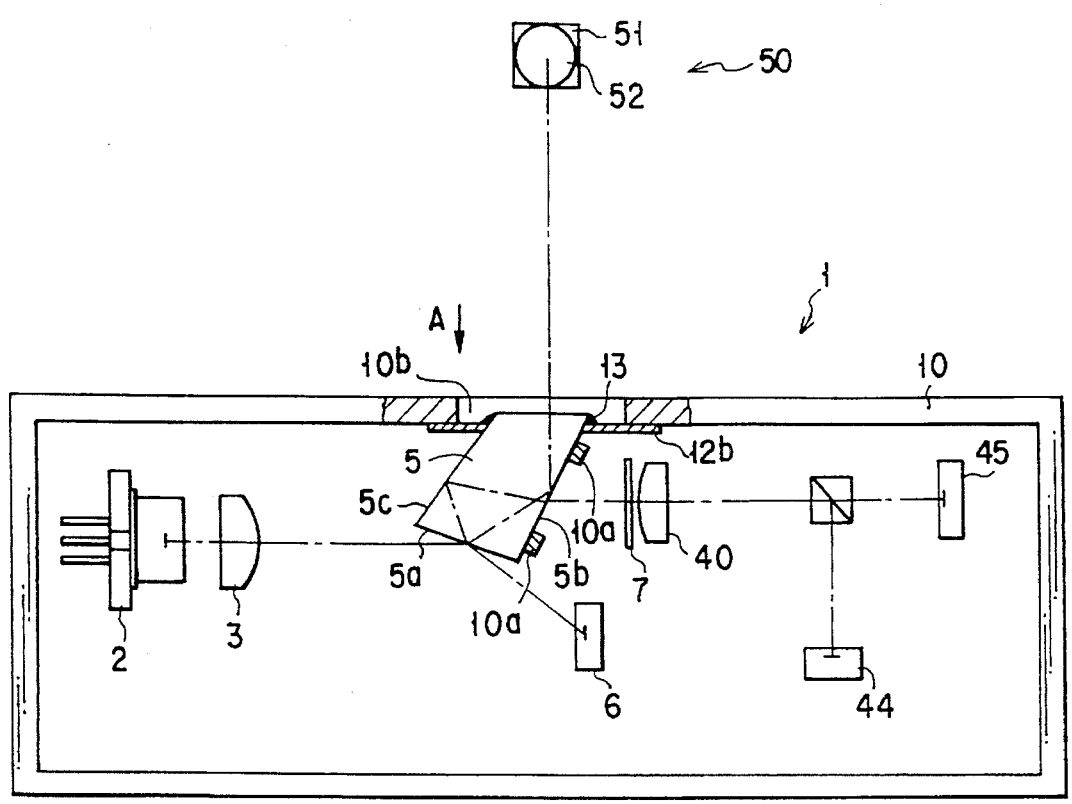
F I G. 9
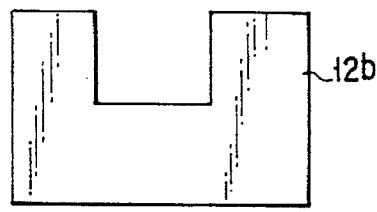
F I G. 11A
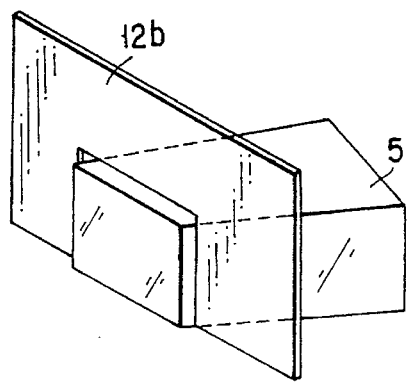
F I G. 11B
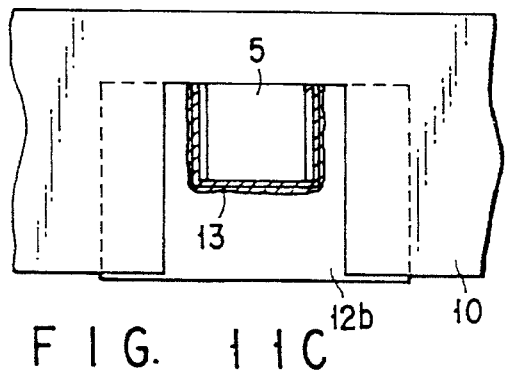
F I G. 11C

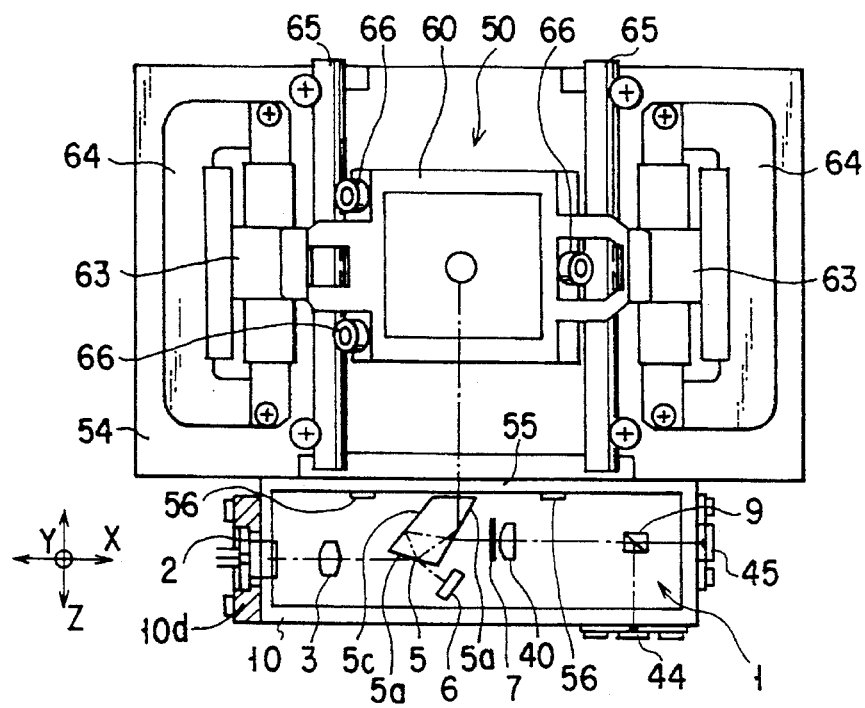
F I G. 12
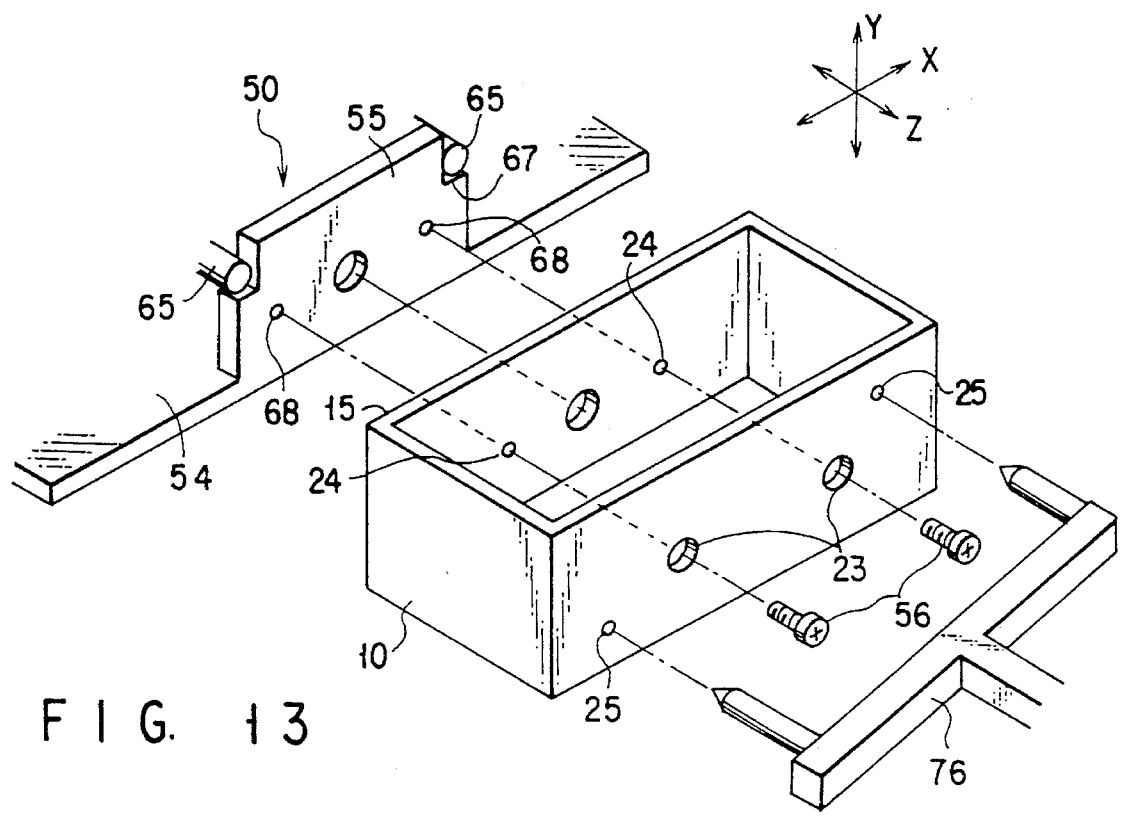
F I G. 13

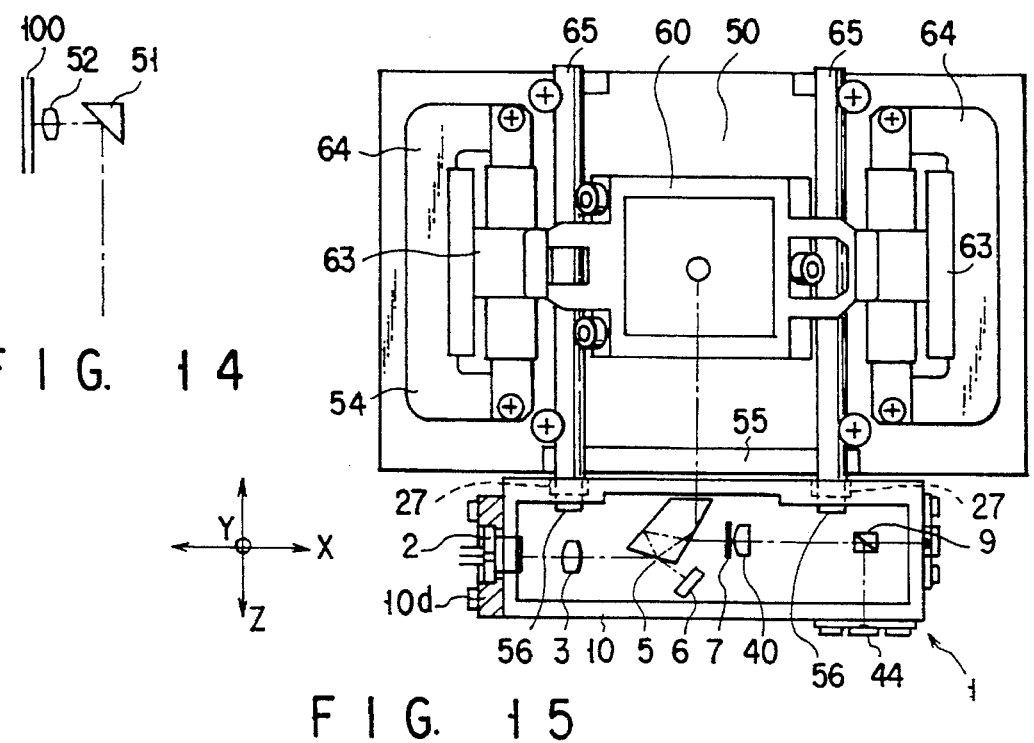
FIG. 14
FIG. 15
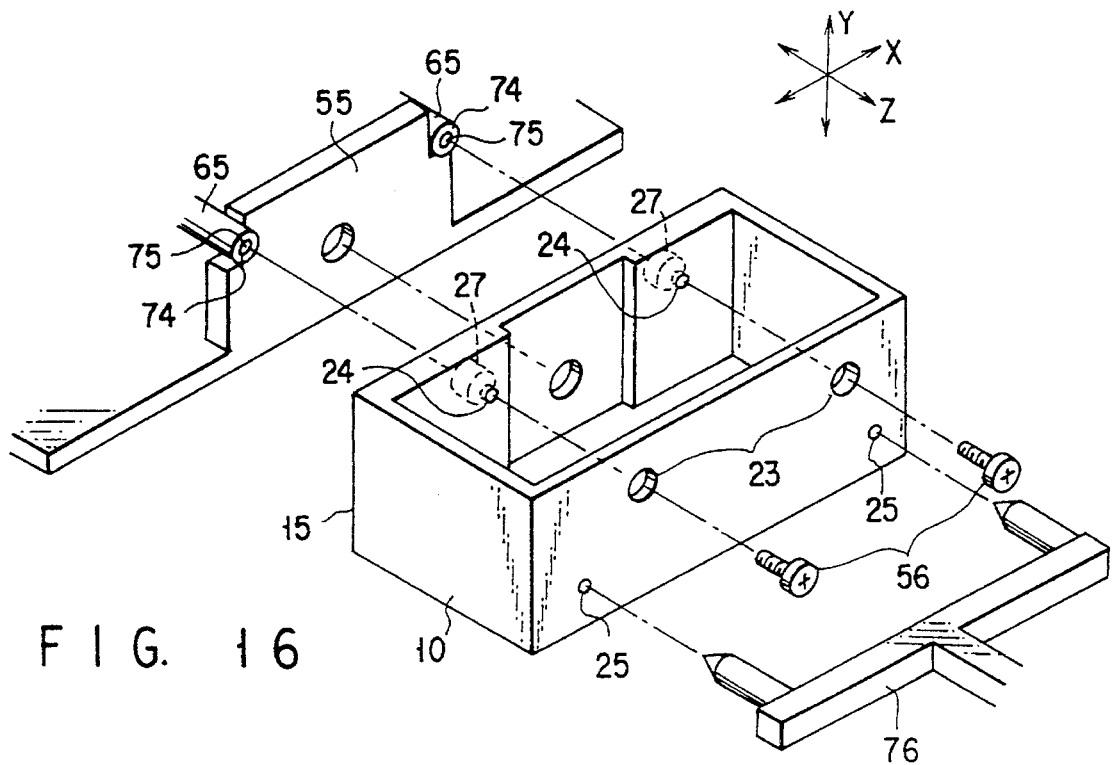
FIG. 16

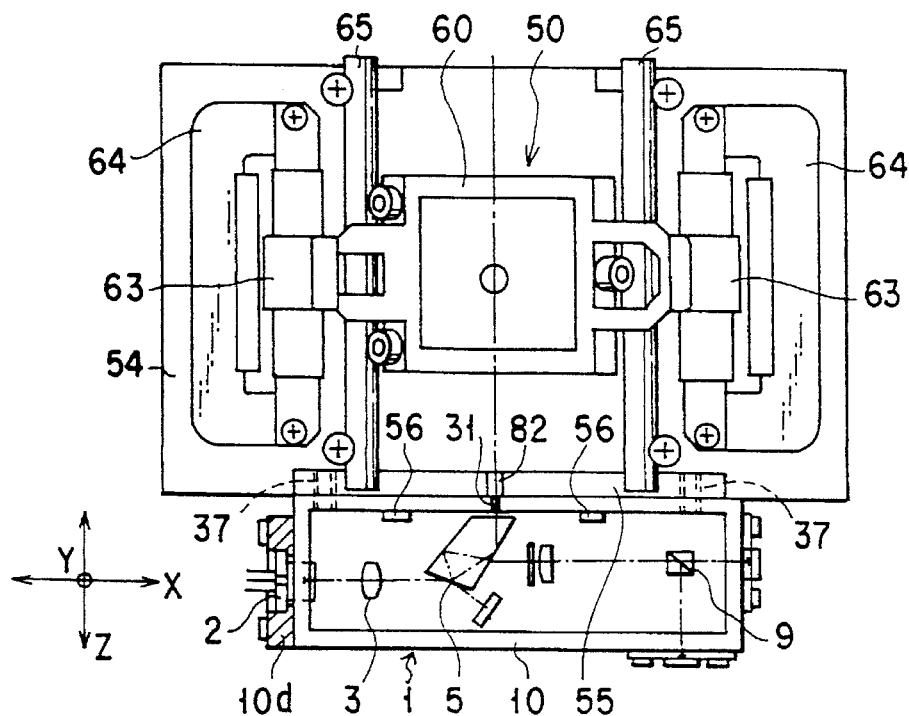
F I G. 25
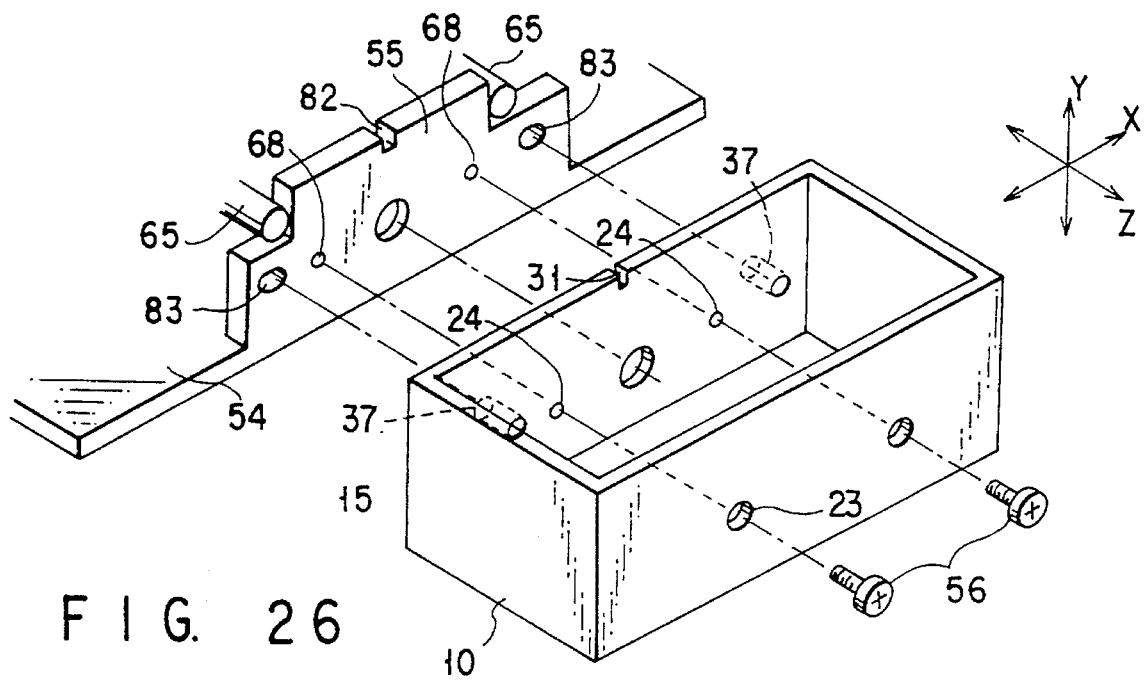
F I G. 26

5,513,121

OPTICAL HEAD

BACKGROUND OF THE INVENTION

1. Field of the Invention

This invention relates to an optical head for use in a data recording/reproducing apparatus for recording/reproducing data with the use of an optical recording medium.

2. Description of the Related Art

A separate-type optical head is known, which comprises a stationary optical system and a movable optical system, so as to shorten the seek time of the head.

The stationary optical system has a semiconductor laser located in a holding member, a shaping prism, a beam splitter, etc. A laser beam emitted from the semiconductor laser passes an opening formed in the holding member, and is directed to a stand mirror provided in a movable carriage unit. The beam reflected from the stand mirror is converged onto an optical recording medium by means of an objective lens.

If the opening of the holding member is not completely sealed, dusts enter the holding member, thereby adversely affecting the optical components therein. Specifically, dusts attached to the laser-passing surface of an element may reduce the power of the laser beam and/or increase the level of a signal noise. To overcome these disadvantages, Jpn. Pat. Appln. Publication KOKAI No. 3-165338 discloses a technique for adhering an optical element to that portion of the inner surface of the holding member which is located around the opening thereof, thereby sealing the opening and preventing dusts from entering therethrough.

If the above technique is applied to an irregularly-shaped optical element which serves as a shaping prism and also as a beam splitter so as to compact the stationary optical system, the attaching portion of the optical element must be made very small, and hence it is very difficult to attach it to the stationary optical system with high accuracy. Further, since in this case, an adhesive is coated on the overall periphery of the attaching portion which surrounds the passage of a laser beam, it is possible that the adhesive extrudes into the passage.

Moreover, Jpn. Pat. Appln. Publication KOKAI No. 2-257432 discloses a separate-type optical head, which has a guide shaft for guiding a movable optical system in a radial direction of an optical disk, and an optical block containing a stationary optical system. The optical block is fixed in position relative to the guide shaft, thereby enabling a laser beam emitted from the stationary optical system, to correspond to the optical axis of the movable optical system. In short, this publication discloses a structure which enables the emission point of a laser source to correspond to the optical axis of the movable optical system.

In general, the emission light from a laser source is allowed to have an inclination error within a range of 2 degrees. However, the above-described conventional technique does not consider an inclination of light from the emission point, and hence it is necessary to correct it actually. This is because even if the emission point of the laser source is made to correspond to the optical axis of a collimator lens, the axis of light deviates from the axis of the collimator lens when the flux of light has an inclination.

Jpn. Pat. Appln. Publication KOKAI No. 3-80523 discloses a separate-type optical head, which has means for correcting a deviation of an optical axis. In this optical head, an optical axis adjusting member is provided between a laser source and a movable optical system such that the adjusting member can rotate about the optical axis of a laser flux. The adjusting member performs predetermined angular adjustment to correct the deviation of the optical axis. However, the employment of the adjusting member inevitably makes the above-described optical head complicated in structure and in adjusting operation.

In addition, Jpn. Pat. Appln. Publication KOKAI No. 3-254448 discloses an optical head, which employs a half mirror and a wedge prism having a total reflection film and a polarization film. In this optical head, a laser beam emitted from a laser source is separated into an approach beam and a return beam by means of the half mirror, and a polarized component is separated from the approach beam by means of the wedge prism. The beams separated by the half mirror and the wedge prism are detected by optical detectors, respectively. In this case, it is possible that a change in the characteristics of the wedge prism is caused by changes in ambient temperature and with lapse of time, with the result that a light beam enters the portion of each optical detector which is deviated from a target portion, and an offset generates in a servo signal from the optical detectors.

SUMMARY OF THE INVENTION

It is an object of the invention to provide an optical head in which the opening of a stationary optical system is accurately sealed, preventing an adhesive from extruding into the passage of light.

It is another object of the invention to provide an optical head of a simple structure capable of correcting to a value within an allowable range the amount of deviation of an optical axis due to its inclination.

It is a further object of the invention to provide an optical head capable of reliably outputting a desired signal, irrespective of changes in ambient temperature or of the aged deterioration of the head.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 1 is a front view, showing an optical head according to a first embodiment of the invention;

FIG. 2 is a side view, showing the optical head of FIG. 1;

FIG. 3A shows a sheet member which seals the opening of a holding member;

FIG. 3B shows the relationship in position between the sheet member and a polarization beam splitter;

FIG. 3C is a plan view, showing a state in which the polarization beam splitter and the sheet member are attached to the holding member;

FIG. 4 shows a retreating mechanism for retreating a magnetic head;

FIGS. 5A and 5B show a circuit for changing the polarity of an electromagnet, wherein FIG. 5A shows a power-on state and FIG. 5B a power-off state;

FIG. 7 is a side view, showing the optical head of FIG. 6;

FIG. 9 is a front view, showing an optical head according to a third embodiment of the invention;

FIG. 10 is a side view, showing the optical head of FIG. 9;

FIG. 11A shows a sheet member which seals the opening of a holding member;

FIG. 11B shows the relationship in position between the sheet member and a polarization beam splitter;

FIG. 11C is a plan view, showing a state in which the polarization beam splitter and the sheet member are attached to the holding member;

FIG. 12 is a plan view, showing an optical head according to a fourth embodiment of the invention;

FIG. 13 is a partial perspective view, showing the optical head according to the fourth embodiment;

FIG. 14 shows the optical path of the movable optical system in the optical head of the fourth embodiment;

FIG. 15 is a plan view, showing an optical head according to a fifth embodiment of the invention;

FIG. 16 is a partial perspective view, showing the optical head according to the fifth embodiment;

FIG. 25 is a plan view, showing an optical head according to a tenth embodiment of the invention;

FIG. 26 is a partial perspective view, showing the optical head according to the tenth embodiment;

DETAILED DESCRIPTION OF THE PREFERRED EMBODIMENTS

Figure 6:
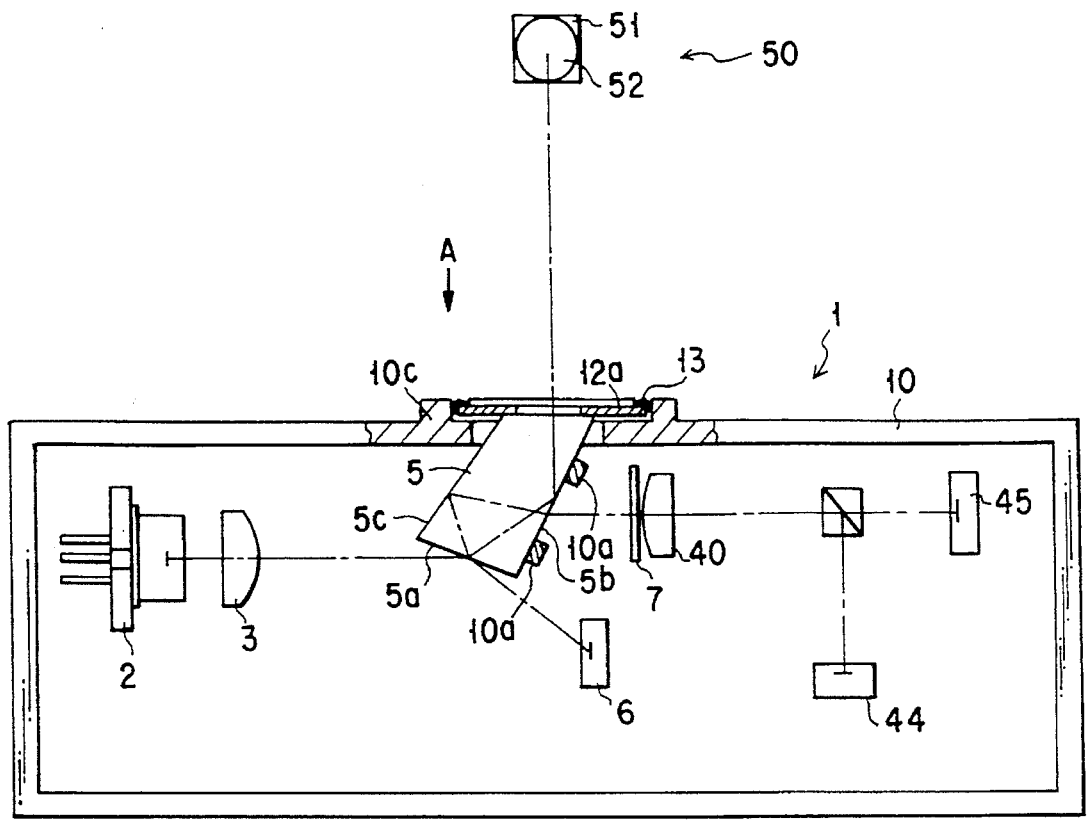
FIG. 6 is a front view, showing an optical head according to a second embodiment of the invention.

The embodiments of the invention will be explained in detail with reference to the accompanying drawings. FIG. 1 is a front view, showing an optical head according to a first embodiment of the invention; and FIG. 2 is a side view of the optical head of FIG. 1. In these figures, reference numeral 1 denotes a stationary optical system located in a holding member 10, and reference numeral 50 denotes a movable optical system which is supported on a movable table 60. The stationary optical system 1 has a semiconductor laser 2. A laser beam emitted from the semiconductor laser 2 is converted into a parallel beam by means of a collimate lens 3, and enters a first surface 5a of a polarization beam splitter 5, where the beam is split into a reflected beam and a transmitted beam. The reflected beam enters a detection element 6 for detecting the intensity of the laser beam emitted from the semiconductor laser. The transmitted beam, whose waveform has been shaped as a result of passing the first surface 5a, enters a second surface 5b of the polarization beam splitter 5 at an angle larger than the critical angle. Then, the beam totally reflects from the second surface 5b, and is guided to a stand mirror 51 of the movable optical system 50 mounted on the movable table 60.

The beam reflected from the stand mirror 51 converges onto an optical disk 100 by means of an objective lens 52. The beam reflected from the optical disk 100 retraces its passage, and enters the first surface 5a of the polarization beam splitter 5 of the stationary optical system 1 via the second surface 5b. The beam reflected from the first surface 5a enters a third surface 5c of the splitter 5, and reflects therefrom to the outside of the splitter 5 via the second surface 5b.

The beam emitted from the polarization beam splitter 5 passes a half wave plate 7 and a focusing lens 40, and is split into two beams by means of a beam splitter 9. The split beams enter photodetector elements 44 and 45, respectively. From a differential signal indicative of the difference between beam intensities detected by the photodetector elements 44 and 45, data stored in the optical disk is detected. Further, a focus error signal and a track error signal are detected by means of one of the detection elements, using a usual beam sizing method or push-pull method.

The coating of the first surface 5a, etc., of the polarization beam splitter 5 is formed of a dielectric multi-layer, which contains, for example, $TiO_2$ and $SiO_2$ as main components. The outermost layer of the coating contains a high density material such as $Al_2O_3$ or $Ta_2O_5$, which enhances the moisture resistance.

Then, the manner of attachment of the polarization beam splitter 5 to the holding member 10 will be explained in detail. The holding member 10 has an opening 10b for emitting a light beam toward the movable optical system 50. The polarization beam splitter 5 projects from the holding member 10 through the opening 10b.

Specifically, the polarization beam splitter 5 is fitted in a opening of a sheet member 12 as shown in FIG. 3A such that a tip portion of the splitter projects therefrom as shown in FIG. 3B. The sheet member 12 is adhered, by the use of an adhesive tape, to that portion of the holding member 10 which is located around the opening 10b, and a silicone-based adhesive is filled in a clearance between the polarization beam splitter 5 and the sheet member 12. The holding member 10 has a pair of fixing members 10a for positioning the splitter 5 in a direction of rotation, and the splitter 5 has its bottom surface fixed to the holding member 10 by means of the fixing members 10a. Thus, the splitter 5 is secured to the holding member 10 as shown in FIG. 1. FIG. 3C shows the relationship between the splitter 5 and the sheet member 12, as viewed in the direction indicated by arrow A. Reference numeral 13 denotes the adhesive filled between the sheet member 12 and the splitter 5.

As explained above, since the polarization beam splitter 5 is secured to the holding member 10 by the use of the fixing members 10a for positioning the rotational direction of the splitter 5, the splitter 5 which has an irregular shape can be fixed accurately, and the opening 10b be sealed. Further, since the adhesive is coated on the side surfaces of the splitter 5, it can be prevented from extruding to the passage of light. Thus, the splitter 5 can be secured to the holding member 10 easily.

Then, referring to FIGS. 2, 4, 5A and 5B, an explanation will be given of a magnetic head-retreating mechanism provided at the movable table 60. The movable table 60 has a lever 62 provided, at its tip portion, with a magnetic head 61 for producing a magnetic field at the time of rewriting data into the optical disk 100. At this time, it is possible that the optical disk 100 collides with the magnetic head 61 when the optical disk 100 is inserted between the magnetic head 61 and the objective lens 52 or retreated therefrom or when the tracking is removed and the movable table 60 goes out of control, with the result that the disk and/or head is broken. To avoid this, the movable table 60 has a retreating mechanism 70 for retreating the magnetic head 61 in the direction away from the disk 100 indicated by the arrow in FIG. 2.

More specifically, the base end portion of the lever 62 having the magnetic head 61 is provided with an upper portion of a plate spring 71. The spring 71 can be contracted and expanded in the direction indicated by the arrow shown in FIG. 4. A lower portion of the spring 71 is secured to the movable table 60. A movable member 72, which can be moved in the direction indicated by the arrow, has an end attached to the base end portion of the lever 62, and the other end secured to a permanent magnet 73. The permanent magnet 73 is attracted to and repelled from an electromagnet 80 provided on the movable table 60 in accordance with the direction of the magnetic field generated therefrom.

In the state shown in FIG. 4, the permanent magnet 73 is attracted to the electromagnet 80, and the lever 62 is pulled downward against that urging force of the plate spring 71, which is transmitted by way of the movable member 72. At this time, the magnetic head 61 is in the position shown in FIG. 2, it is possible that the data can be rewritten into the optical disk 100. On the other hand, when the polarity of the electromagnet 80 has been changed, the permanent magnet 73 is repelled, and the lever 62 is urged by the plate spring 71 via the movable member 72 and moved upward from the position shown in FIG. 4 by a predetermined distance. At this time, the magnetic head 61 is retreated from the position shown in FIG. 2 in the direction indicated by the arrow.

FIGS. 5A and 5B show a circuit for changing the polarity of the electromagnet 80. The coil side and the power side of the electromagnet 80 are relayed with two-three terminals. When the power is in the on-state as shown in FIG. 5A, the relay circuit is set such that current flows in a direction in which the permanent magnet is attracted to the coil. At this time, a capacitor C is charged with electricity. Upon receiving an inject signal or detecting that a laser beam output from the optical head is deviated from a target track, the relay circuit is switched as shown in FIG. 5B. At the same time, the capacitor is discharged, and current flows through the coil in the direction indicated by the arrow, thereby changing the polarity of the electromagnet and causing the permanent magnet to repel the electromagnet. As a result, the magnetic head can be reliably and smoothly retreated.

Then, a second embodiment of the invention will be explained with reference to FIGS. 6, 7, and 8A to 8C. The following embodiments, elements similar to those employed in the first embodiment are denoted by corresponding reference numerals.

Figure 8A:
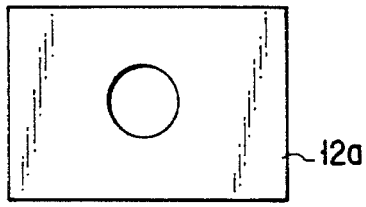
FIG. 8A shows a sheet member which seals the opening of a holding member.
Figure 8C:
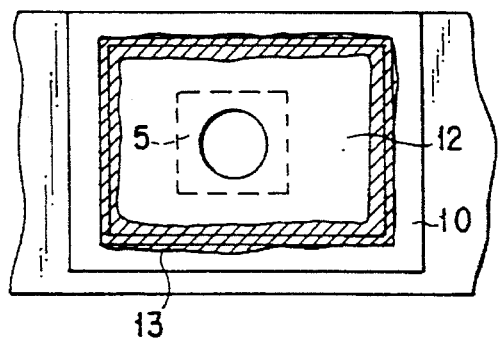
FIG. 8C is a plan view, showing a state in which the polarization beam splitter and the sheet member are attached to the holding member.
Figure 8B:
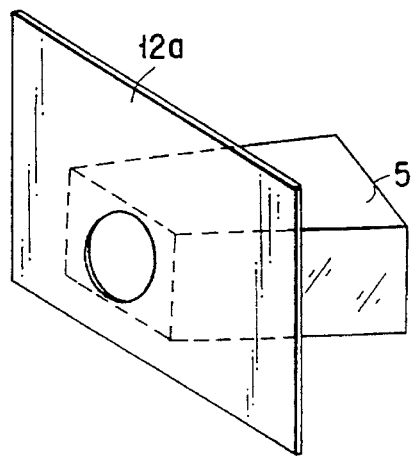
FIG. 8B shows the relationship in position between the sheet member and a polarization beam splitter.

In the second embodiment, the holding member 10 has a projection member 10c around the opening 10b, to which an edge portion of a sheet member 12a is adhered. The sheet member 12a has a circular opening as shown in FIG. 8A, and an adhesive tape is attached to that portion of the sheet member 12a which surrounds the circular opening. As is shown in FIG. 8B, the polarization beam splitter 5 is attached to the sheet member 12a by means of the adhesive tape. The edge of the sheet member 12a is adhered to the inner surface of the projection member 10c of the holding member 10, with an adhesive 13 filled therebetween.

Since in the second embodiment, the adhesive 13 is coated at a location remote from the polarization beam splitter 5 (see FIG. 8C), the coating can be performed easily, and extrusion of the adhesive to the passage of light can reliably be prevented. Further, if the sheet member 12a is made of a soft material, the sheet member can be adhered to the projection member 10c of the holding member 10 by the use of another adhesive tape, too, and hence the coating operation of the adhesive 13 can be omitted.

A third embodiment of the invention will be explained, referring to FIGS. 9, 10 and 11A to 11C. In this embodiment, a sheet member 12b is U-shaped as shown in FIG. 11A, the polarization beam splitter 5 is fitted in an opening of the sheet member 12b such that a tip portion of the splitter 5 projects from the opening as shown in FIG. 11B. The sheet member 12b with an adhesive tape is adhered to that portion of the inner surface of the holding member which is located around the opening thereof such that the sheet member seals the opening, and the adhesive 13 is filled between side surfaces of the splitter 5 and the sheet member 12b. Since in this structure, it is not necessary to make the splitter 5 project from the opening of the holding member 10, and it suffices that the adhesive 13 is coated on only three side surfaces of the splitter 5 (see FIG. 11C), so that the adhesion process is a simple process. It is a matter of course that the U-shaped sheet member 12b may be adhered to that portion of the outer surface of the holding member which is located around the opening thereof.

In the above-described embodiments, the shape of the sheet member and/or the optical component sealing the opening can be modified in various manners. Thus, in the above optical head, adding a simple component thereto enables an irregular optical component to be accurately secured to the holding member of the stationary optical system, and also enables the opening, through which a laser beam is emitted, to be sealed. Further, the adhesive is prevented from extruding into the passage of light, which enables optical components to be assembled easily.

An optical head will now be explained, which has means for correcting a deviation of the optical axis thereof due to an inclination of the optical axis of the laser source.

FIGS. 12 to 14 show a fourth embodiment of the invention.

In this embodiment, the semiconductor laser 2 of the stationary optical system 1 is held by a holding portion 10d formed on the outer surface of the holding member 10. The structure of the holding member 10 in this embodiment will be explained with reference to FIG. 13. The holding member 10 which contains optical components shown in FIG. 12 has the shape of a rectangular parallelopiped. A front surface portion 15 of the rectangular parallelopiped contacts the adjusting surface 55 of an optical frame 54, hereinafter referred to. In this state, the holding member 10 is secured to the frame 54 by means of a pair of screws 56 as fixing means.

A rear surface portion of the holding member 10 has a pair of large-diameter through holes 23, in which the screws 56 are inserted. Further, a pair of through holes 24 in which the screw portions of the screws 56 are inserted are formed in those portions of the front surface 15 of the holding member 10 which are opposed to the through holes 23. Each through hole 24 has a diameter slightly larger than the screw portion of each screw 56 and smaller than the head of the screw. Thus, the holding member 10 is movable relative to the optical frame 54 in the X- and Y-directions, so that a deviation of the optical axis is adjustable.

The movable optical system 50 is contained in the optical frame 54 such that it is movable in a direction parallel with a beam flux (i.e., in a radial direction of the optical disk). A pair of coils 63 are attached to the movable table 60 with the stand mirror 51 and the objective lens 52, and a pair of magnetic circuits 64 comprising a permanent magnet and a yoke respectively, are provided in that portion of the optical frame 54 which are located opposed to the each coil 63. A pair of guide shafts 65 are supported by the optical frame 54 such that they are parallel with a laser beam output from the stationary optical system. Bearing members 66, which can rotate and contact the guide shafts 65, are provided on the movable table 60. With the above structure, the movable table 60 can be moved by an electromagnetic force along the guide shafts 65.

The adjusting surface 55 is formed integral with that portion of the optical frame 54 and extending perpendicular to that one. The adjusting surface 55 is located on the side of the stationary optical system 1, and has opposite ends each provided with a stepped portion 67 for supporting a corresponding one of the guide shafts 65. Further, the adjusting surface 55 has a pair of screw holes 68 formed opposed to the through holes 24 of the holding member 10 and inserting therethrough the screw portions of the screws 56.

The adjustment of an inclination of the optical axis and the correction of a deviation of the same will be explained. First, an inclination of the optical axis is adjusted by moving the holding portion 10d, which holds the semiconductor laser 2, relative to the holding member 10 in the Z- and/or Y-directions, thereby aligning the emission point of the laser 2 with the optical axis of the collimator lens 3.

On the other hand, a deviation of the optical axis is corrected, by moving the holding member 10 in the X- and Y-directions in a state where the front surface portion 15 of the holding member 10 contacts the adjusting surface 55 of the optical frame 54 so as to aligne the axis of light emitted from the stationary optical system 1 with the center of the objective lens 52. When they have been aligned with each other, the screws 56 are screwed to fasten the holding member 10 to the optical frame 54. At this time, the holding member 10 can be easily adjusted by inserting tip portions of a yoked-type jig 76, as shown in FIG. 13, into the inserting holes 25, and moving the member 10 in the X- and Y-directions.

As described above, an inclination and a deviation of the optical axis can be easily adjusted and corrected, if the inclination of the exit light is 2 to 3 degrees. In other words, a semiconductor laser which has inclination of 2 to 3 degrees of the exit light is within an allowable range of error.

Further, in this embodiment, the through holes 24 may be formed outside of the holding member 10, in which case no through holes 23 are necessary. In addition, a spring washer may be interposed between the holding member 10 and the screws 56. Since the spring washer spontaneously urges the holding member 10 against the optical frame 54 even when the screws 56 are not completely fastened, the washer makes it unnecessary to forcibly urge the member 10 against the frame 54 at the time of adjusting the member 10, and also prevents the member 10 from being displaced from a predetermined position at the time of fastening the screws 56. It is a matter of course that another type of washer may be used in place of the spring washer to obtain the above effects.

FIGS. 15 and 16 show a fifth embodiment of the invention. In this embodiment, a pair of guide shafts 65 slightly project from the surface 55, and have flat end surfaces perpendicular to the projecting direction, which serve as adjusting surfaces 74 for adjusting the holding member 10. A screw hole 75 is axially formed in each adjusting surface 74, in which a corresponding screw 56 as fixing means is screwed.

Concave portions 27 are formed in the front portion 15 of the holding member 10, in which end portions of the guide shafts 65 are inserted. Each concave portion has a diameter larger than that of guide shaft 65, and therefore the holding member 10 can be moved to displace the guide shaft 65 so as to correct a deviation of the optical axis. A through hole 24 is formed in the bottom of each concave portion 27 such that it extends through the front portion 15.

In the above embodiment, deviation correction is performed by moving the holding member 10 in a state in which end portions of the guide shafts 65 are inserted in the concave portions 27 of the member 10, and then the holding member 10 is fixed to the optical frame 54 by the use of the screws 56. Since it is not necessary to form screw holes 75 for the screws 56 in the optical frame 54, the frame 54 can be made compact. Further, since the holding member 10 is adjusted with the guide shafts 65 inserted in the concave portions 27, rough positioning can be performed at the time of adjustment.

Figure 17:
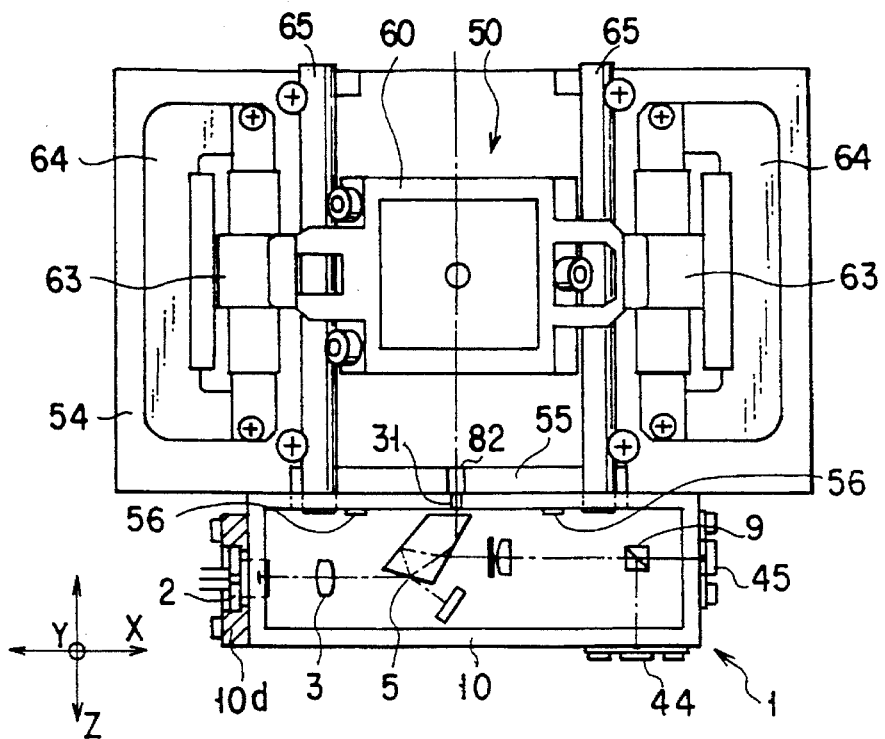
FIG. 17 is a plan view, showing an optical head according to a sixth embodiment of the invention.
Figure 18:
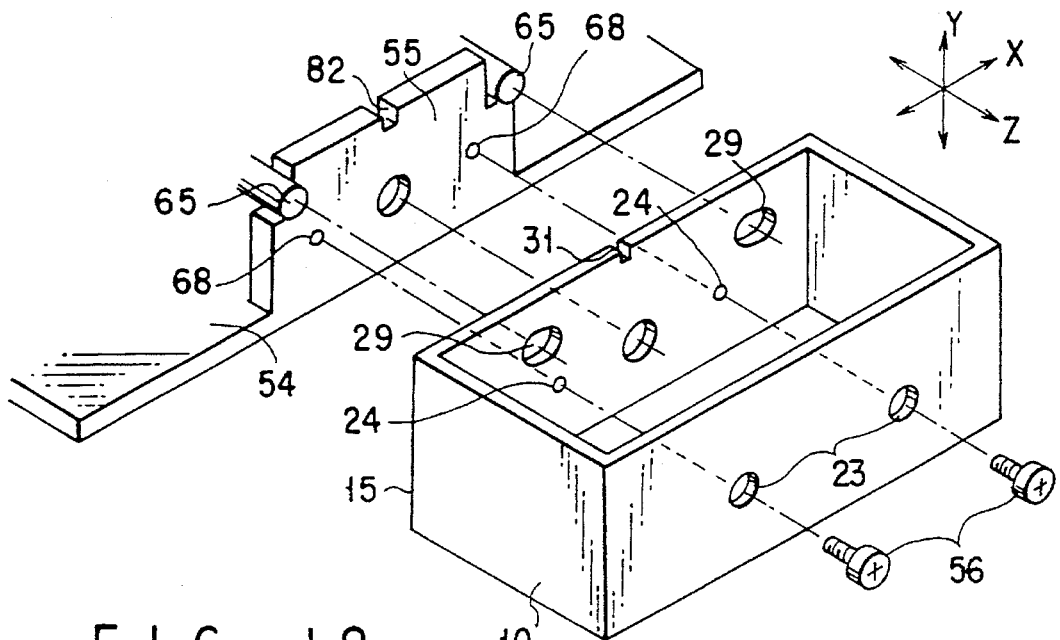
FIG. 18 is a partial perspective view, showing the optical head according to the sixth embodiment.

FIGS. 17 and 18 show a sixth embodiment of the invention. In this embodiment, the guide shafts 65 slightly project from the adjusting surface 55 of the optical frame 54, while the front portion 15 of the holding member 10 has long holes 29, which receive the project portions of the guide shafts 65, respectively. The long holes 29 are elongated in the X-direction, and the holding member 10 is moved in the X-direction to correct a deviation of the optical axis. Moreover, in this embodiment, cutout portions 82 and 31 are formed in the upper surface of the adjusting surface 55 of the optical frame 54 and that of the front portion 15 of the holding member 10, respectively, such that the cutout portions are aligned with each other. Fine correction of a deviation of the optical axis can be performed by inserting an adjusting tool, such as a driver, in the cutout portions 82 and 31 and rotating the adjusting tool.

In this embodiment, deviation correction is not performed in the Y-direction. This is because that, in the fairing prison such as polarization beam splitter, the amount of deviation in the Y-direction is as small as about ½.5 of that in the X-direction, which falls within an allowable range. This means that the amount of variation of the light intensity on the disk falls within a substantially allowable range of 3%. In this embodiment, the jig 76 used in the fourth embodiment is not necessary to correct a deviation of the optical axis.

Figure 19:
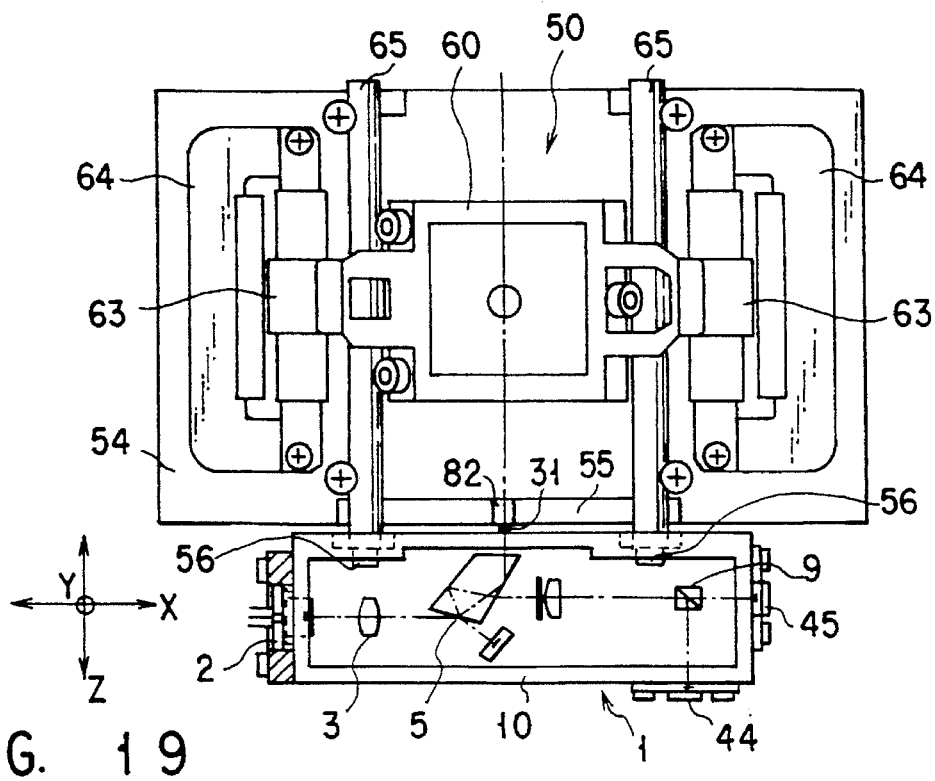
FIG. 19 is a plan view, showing an optical head according to a seventh embodiment of the invention.
Figure 20:
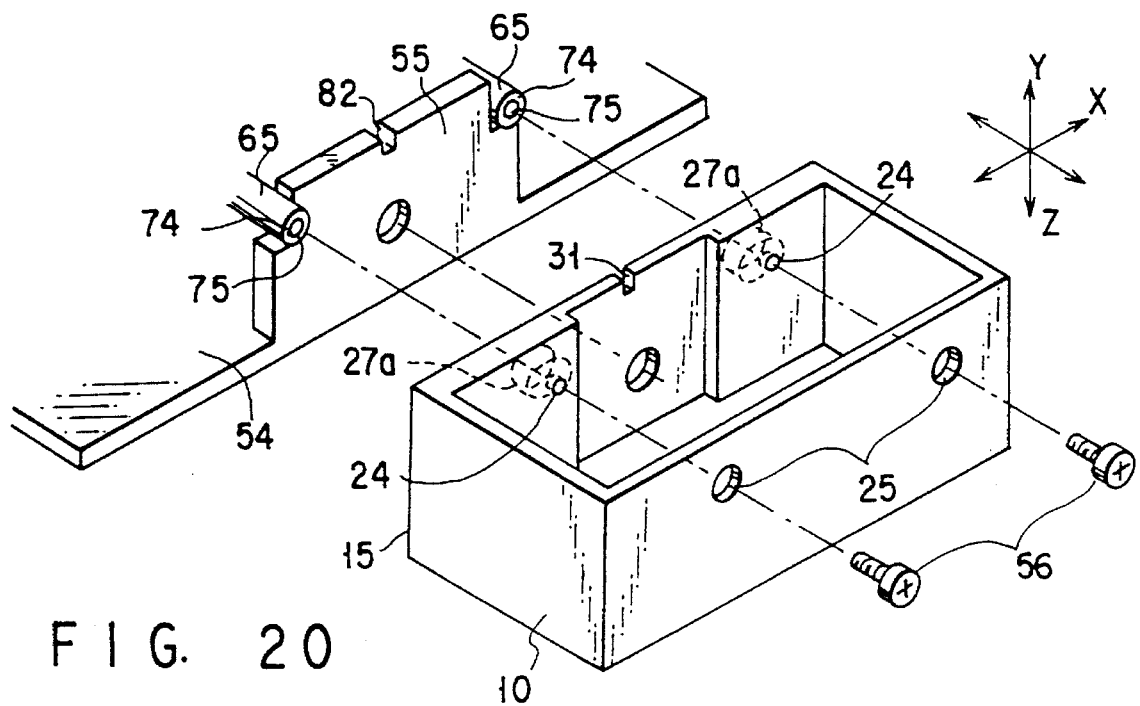
FIG. 20 is a partial perspective view, showing the optical head according to the seventh embodiment.

FIGS. 19 and 20 show a seventh embodiment. This embodiment is the combination of the fifth and sixth embodiments. The screw hole 75 is formed in an end face of each guide shaft 65. Long concave portions 27a are formed in the front portion 15 of the holding member 10, for restraining the Y-directional movement of the guide shafts 65 and allowing the X-directional movement of them. Further, the cutout portions 82 and 31 for receiving a driver or the like are formed in the optical frame 54 and the holding member 10. This structure enables production of a compact optical frame 54, rough adjustment of the holding member 10, and fine adjustment of the optical axis with the use of a driver or the like.

Figure 21:
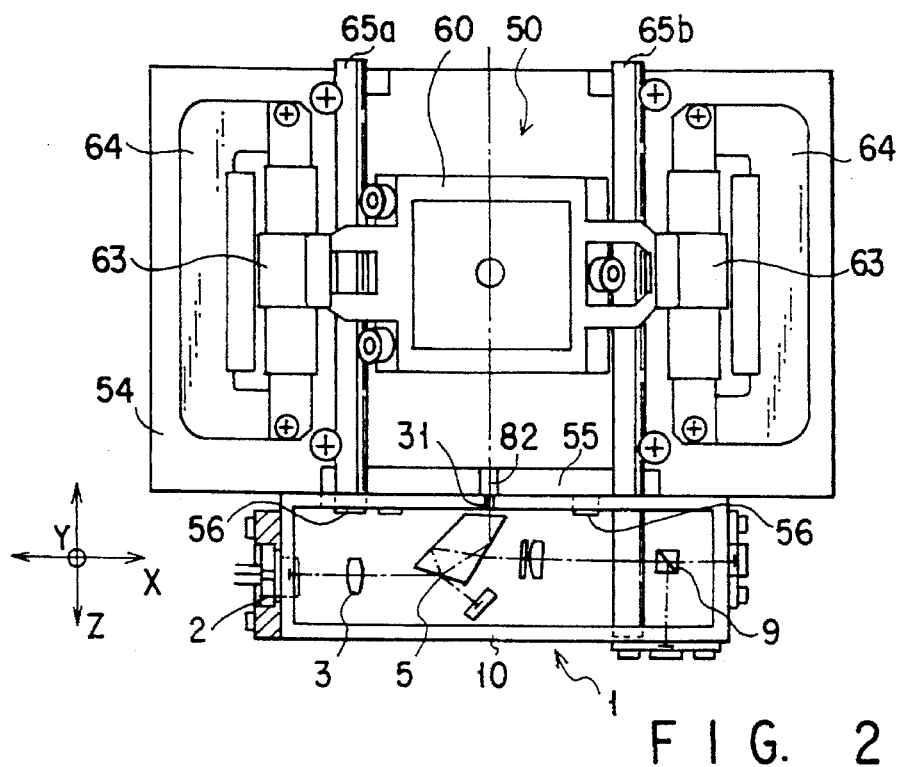
FIG. 21 is a plan view, showing an optical head according to an eighth embodiment of the invention.
Figure 22:
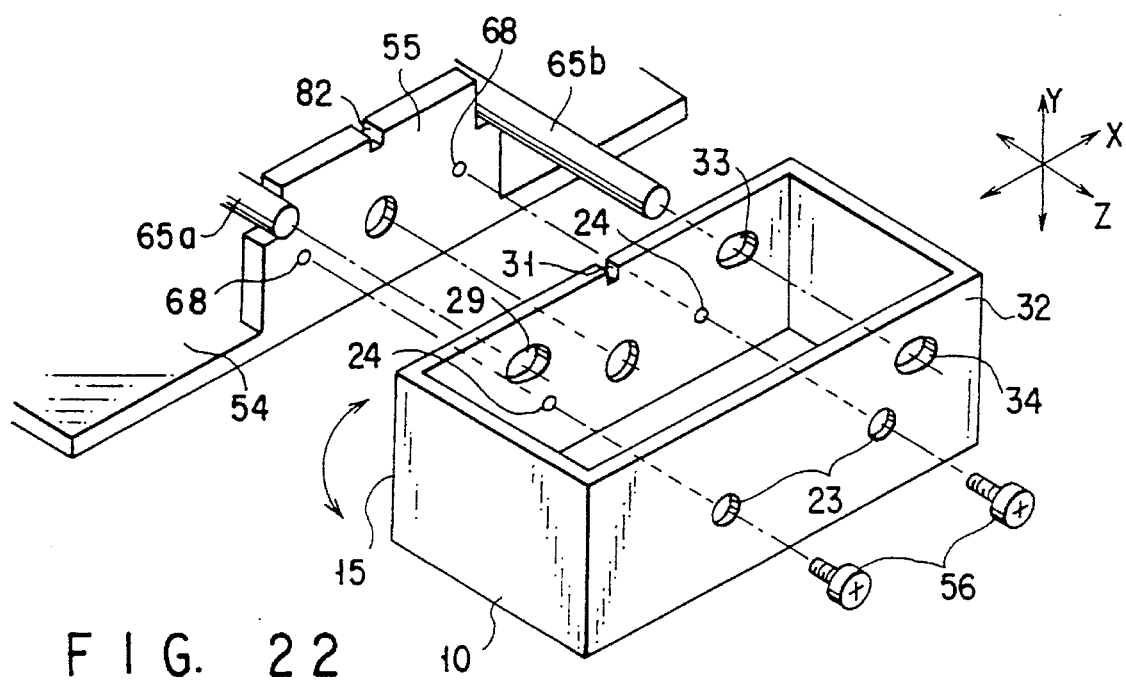
FIG. 22 is a partial perspective view, showing the optical head according to the eighth embodiment.

FIGS. 21 and 22 show an eighth embodiment of the invention. In this embodiment, a pair of guide shafts 65a and 65b are provided for guiding the movable table. One of the shafts, i.e. the shaft 65b, projects from the adjusting surface 55 such that it can be inserted through long holes 33 and 34, which are respectively formed in the front portion 15 and that rear portion 32 of the holding member 10 which is opposed to the front portion 15.

In this embodiment, the holding member 10 can be attached to the optical frame 54, with the projecting guide shaft 65b inserted through the long holes 33 and 34, so that the assemblage accuracy of the holding member 10 and the optical frame 54 are improved in a direction 6 in the X-Z plane.

Figure 23:
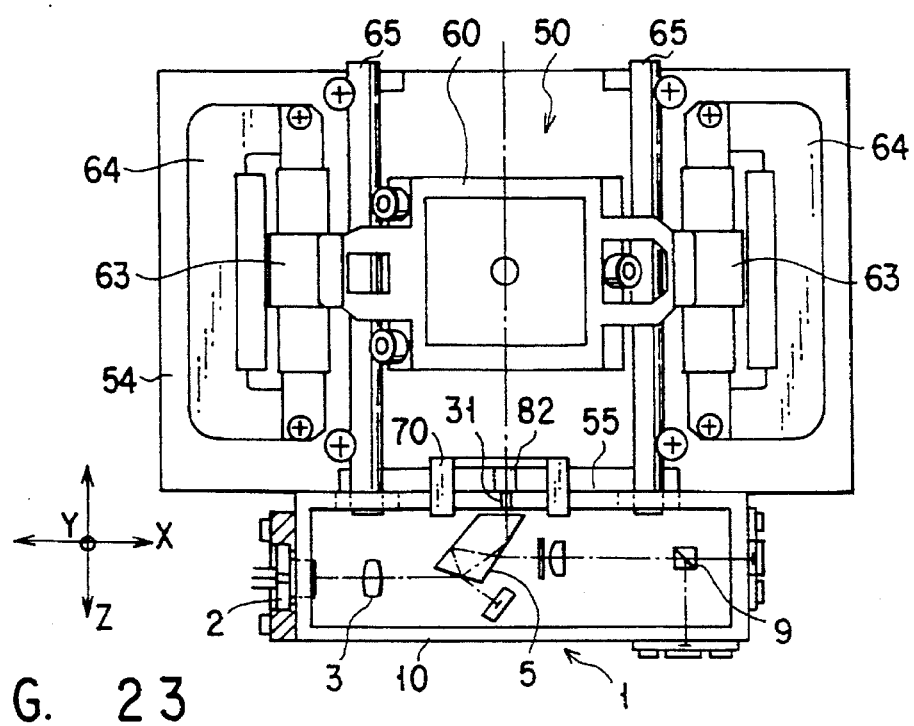
FIG. 23 is a plan view, showing an optical head according to a ninth embodiment of the invention.
Figure 24:
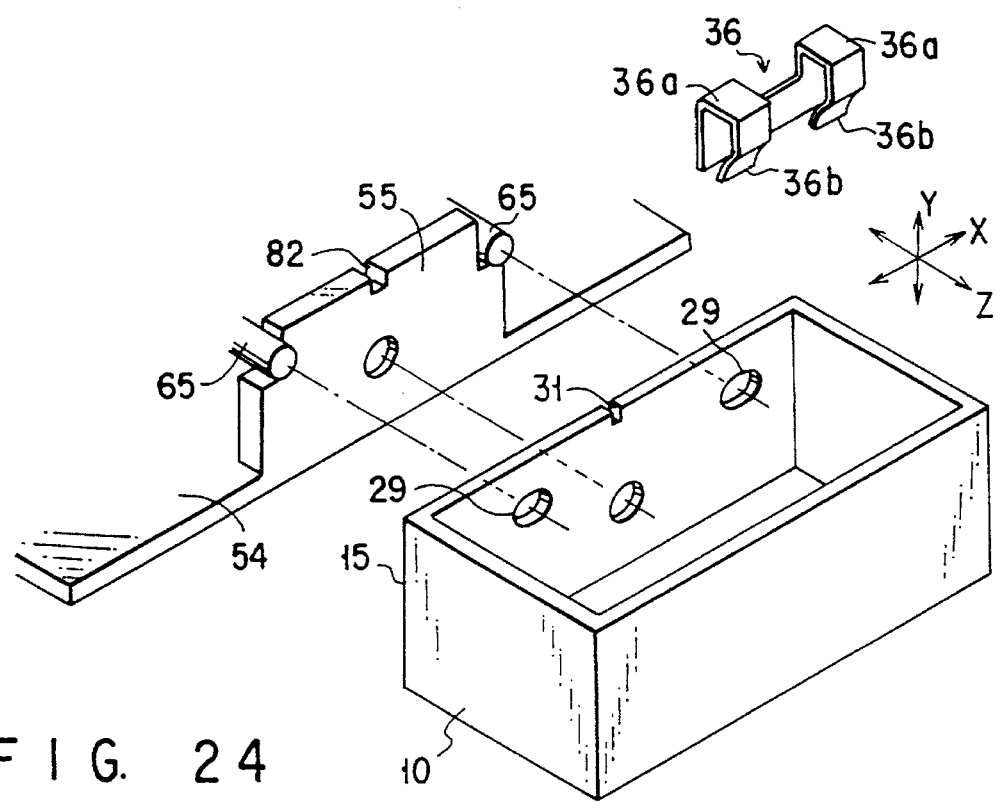
FIG. 24 is a partial perspective view, showing the optical head according to the ninth embodiment.

FIGS. 23 and 24 show a ninth embodiment of the invention. This embodiment uses a clip 36 as a fixing member for fixing the holding member 10 to the optical frame 54. The clip 36 has clipping portions 36a for clipping the front portion 15 of the holding member 10 and the adjusting surface 55 erecting from the optical frame 54; and a plate spring portion 36b for elastically urging the holding member 10. The clip 36 renders unnecessary the screws 56 employed in the sixth embodiment, and facilitates the assemblage.

In the above-described sixth through ninth embodiments, a knock pin may be provided at the optical frame 54, for positioning the frame 54 and the holding member 10 in place of the guide shafts 65 (65a and 65b).

FIGS. 25 and 26 show a tenth embodiment of the invention. In this embodiment, a pair of knock pins 37 are provided at the front portion 15 of the holding member 10, and long holes 83 are formed in the adjusting surface 55 of the frame 54 for inserting therein the knock pins 37. Like the long holes 29 employed in the sixth embodiment, the long holes 83 is elongated in the X-direction, enabling the X-directional movement of the holding member 10 to correct a deviation of the optical axis.

As explained above, in the fourth through tenth embodiments, an inclination of the optical axis, if it falls within a range of 2 to 3 degrees, can be adjusted with the use of a simple structure. Although the optical head employed in each of the fourth through tenth embodiments does not have means for sealing the opening of the holding member 10, the head may have such means as in the cases of the first through three embodiments.

Then, optical heads according to other embodiments, which are characterized in the optical system, will be explained.

Figure 27:
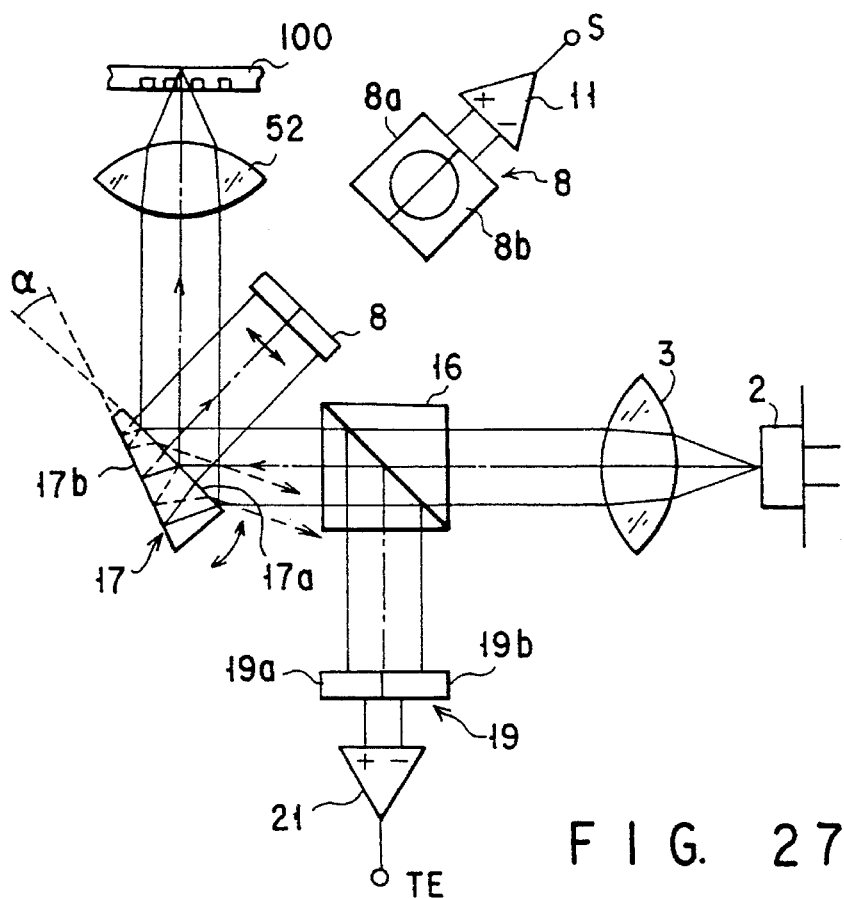
FIG. 27 is a view, showing an optical head according to an eleventh embodiment of the invention.

FIG. 27 shows an optical head according to an eleventh embodiment of the invention. In this embodiment, light emitted from the semiconductor laser 2 is converted into parallel light by means of the collimator lens 3, and then enters the beam splitter 16. The light having passed the beam splitter 16 enters a tracking mirror 17, which is formed of a non-parallel flat plate rotatable in the direction indicated by the arrow.

The tracking mirror 17 has a first surface 17a coated with a dielectric multi-layered film having high and low refractive indexes, so as to reflect substantially 90% of light input to the tracking mirror 17. The light reflected from the surface 17a of the mirror 17 is converged onto the optical disk 100 by means of the objective lens 52. Further, the light, which has passed the first surface 17a and has reflected from a second surface (reverse surface) 17b, again passes the first surface 17a and is received by a two-piece photodetector 8 with two light-receiving regions 8a and 8b. Outputs from the detector 8 are supplied to a difference detector 11, which in turn outputs a difference signal S proportional to the angle through which the tracking mirror 17 has rotated.

The light reflected from the optical disk 100 (i.e. the light returned) passes the objective lens 52, thereby reflecting from the surface 17a of the tracking mirror 17, further reflecting from the beam splitter 16, and being received by a two-piece photodetector 19 with two light-receiving regions 19a and 19b. Outputs from the detector 19 are supplied to a difference detector 21, where a track error signal (TE) is obtained with the use of the push-pull method.

The angle α of the tracking mirror 17 shown in FIG. 27 is set to a value, which satisfies the following conditions (a) and (b). As described above, the light emitted from the semiconductor laser 2 passes the first surface 17a, reflects from the second surface 17b, and again reflects from the first surface 17a. In such multiple reflection, (a) the multi-reflected light must be prevented from entering the photodetector 8. In addition, the light returned from the optical disk 100 passes the first surface 17a of the tracking mirror 17, then reflects from the second surface 17b, again passes the first surface 17a, and passes a passage differing from that of the light reflected from the first surface 17a, as is indicated by the broken lines. (b) The light indicated by the broken lines must be prevented from entering the photodetector 19.

In the above-described structure, the center of the spot of light on the two-piece photodetector 8 is set to be positioned on the boundary between the light-receiving regions 8a and 8b when the tracking mirror 17 is in a neutral position. The difference signal S output from the difference detector 11 assumes a value of 0 when the spot of light is positioned on a recording track of the optical disk 100. When the optical disk 100 horizontally moves during operation, and the tracking mirror 17 rotates in accordance with the movement of the disk 100; the light spot moves on the two-piece photodetector 8, and the difference detector 11 outputs, instead of a signal S of O, a proportional signal in accordance with the rotation angle of the tracking mirror 7.

Since in the eleventh embodiment, the non-parallel flat tracking mirror 17 has a function of a beam splitter, it is not necessary to employ such a beam splitter as used in the conventional optical head. Accordingly, this embodiment is free from an offset in the difference signal S due to the temperature variation or the aged deterioration of the beam splitter. Further, since the light emitted from the laser 2 and reflected several times is set not to enter the photodetector 8, no interference of light can occur thereon. Thus, even if the thickness of the tracking mirror 17 varies in accordance with changes in ambient temperature, the difference signal S is not offset. Moreover, since the angle of the tracking mirror 17 is detected on the basis of the light reflected from the second surface 17b of the tracking mirror 17, the detection accuracy is enhanced.

In the eleventh embodiment, the amount of light emitted from the semiconductor laser 2 can be controlled on the basis of the sum of the outputs of the two light-receiving regions 8a and 8b of the two-piece photodetector 8.

Figure 28:
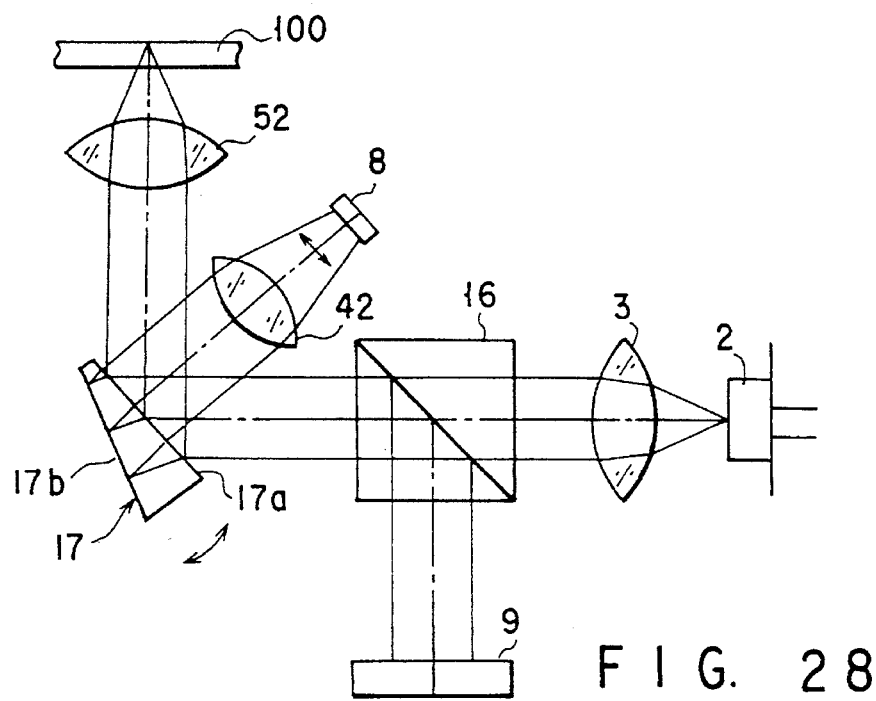
FIG. 28 is a view, showing an optical head according to a twelfth embodiment of the invention.

FIG. 28 shows an optical head according to a twelfth embodiment of the invention. This embodiment is similar to the embodiment shown in FIG. 27, except for that a converging lens 42 for converging light onto the two-piece photodetector 8 is interposed between the tracking mirror 17 and the photodetector 8. The converging lens 42 enhances the detection accuracy of the rotation angle of the tracking mirror 17, and enables the photodetector 8 to be made compact, thereby enabling the optical head to be made compact and reducing the manufacturing cost thereof.

Figure 29:
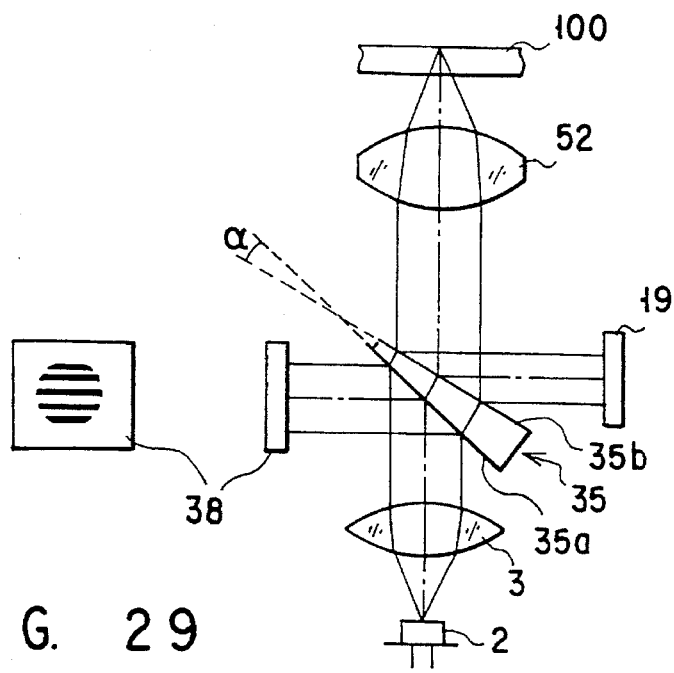
FIG. 29 is a view, showing an optical head according to a thirteenth embodiment of the invention.

FIG. 29 shows an optical head according to a thirteenth embodiment of the invention. In this embodiment, the light from a semiconductor laser 2 is converted into parallel light by means of a collimator lens 3, and then enters a beam splitter 35 formed of a non-parallel flat plate. The light reflected by a first surface 35a of the beam splitter 35 is received by a photodetector 38 with a single light-receiving region, and the light output of the semiconductor laser 2 is controlled on the basis of the output of the photodetector 38. In addition, light, which has sequentially passed the first surface 35a and a second (reverse) surface 35b of the beam splitter 35, is converged onto the optical disk 100 by means of the objective lens 52, and light reflected from the optical disk 100 (returned light) passes the objective lens 52, then reflects from the second surface 35b of the beam splitter 35, and is received by the two-piece photodetector 19.

In this case, the angle a of the beam splitter 35 is set to fall within a range of several minutes to several degrees, so that interference fringes can be formed on the photodetector 38, as a result of interference between light reflected from the first surface 35a of the beam splitter 35, and light obtained after passing the surface 35a; reflecting in the splitter 35 several times and again passing the surface 35a.

In the above structure, the sum of the amount of light directed to the side of the objective lens 52 via the beam splitter 35 and that of light directed to the photodetector 38 is constant. In other words, light emitted from the laser 2 is split, using a predetermined ratio, into light components directed to the side of the objective lens 52 and to the side of the photodetector 38. The splitting ratio is determined on the basis of a dielectric member or a metal thin film coated on the first or second surface 35a or 35b of the beam splitter 35. Therefore, when the thickness of the beam splitter 35 has changed due to a change in ambient temperature, the bright portions of the interference fringes on the photodetector 38 are changed to dark portions, or vice versa, at regular intervals. Accordingly, the larger the number of the interference fringes, the narrower the range of variations in the amount of light on the photodetector 38. As a result, the light output of the semiconductor laser 2 can be accurately controlled on the basis of the output of the photodetector 38, thereby enabling a desired amount of light to be emitted in a reliably manner. In the twelfth embodiment, light directed from the beam splitter 35 to the objective lens 52 also has interference fringes. Since the light is converged by the objective lens 52, a usual light spot is projected on the optical disk 100.

Figure 30:
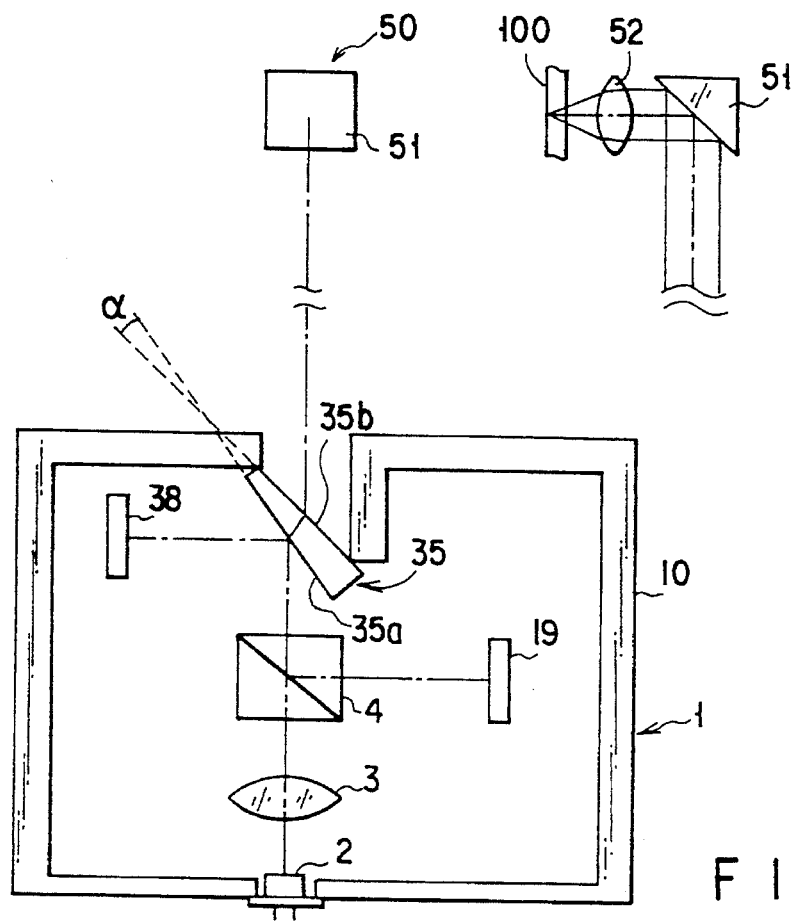
FIG. 30 is a view, showing an optical head according to a fourteenth embodiment of the invention.

FIG. 30 shows an optical head according to a fourteenth embodiment of the invention. In this embodiment, the holding member 10 of the stationary optical system 1 contains the semiconductor laser 2, the collimator lens 3, the beam splitter 4, the non-parallel flat beam splitter 35, the photodetector 38 and the two-piece photodetector 19. Light emitted from the semiconductor laser 2 is converted into parallel light by means of the collimator lens 3, then passes the beam splitter 4 and enters the beam splitter 35. Light reflected from the surface 35a of the splitter 35 is received by the photodetector 38, thereby controlling the light output of the laser 2. Light having passed the beam splitter 35 is converged onto the optical disk 100 via the stand mirror 51 and the objective lens 52 in the movable optical system 50.

As in the case of the embodiment shown in FIG. 29, the angle α of the beam splitter 35 is set in this embodiment to fall within a range of several minutes to several degrees, so that interference fringes can be formed on the photodetector 38, as a result of interference between light reflected from the first surface 35a of the beam splitter 35, and light obtained after passing the surface 35a; reflecting in the splitter 35 several times and again passing the surface 35a.

Further, light returned from the optical disk 100 enters the beam splitter 35 via the objective lens 52 and the stand mirror 51, then reflects from the beam splitter 4, and enters the two-piece photodetector 19. Moreover, as in the cases of the first through third embodiments, it is possible that sealing means seals a clearance between the holding member 10 and the beam splitter 35.

In the fourteenth embodiment, a reduction in the output of the photodetector 38 due to dusts stacked thereto can be prevented, so that the output power of the semiconductor laser 2 can be controlled more accurately than the thirteenth embodiment.

In summary, the optical heads according to the eleventh through fourteenth embodiments can provide a desired signal from a photodetector in a reliable manner, without being adversely affected by changes in ambient temperature, their aged deterioration, or stray light.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An optical head having a stationary optical system for radiating a light beam onto an optical recording medium and receiving the light beam reflected from the optical recording medium, comprising:

an optical frame;

a pair of guide shafts supported by the optical frame and extending parallel with each other;

a movable optical system movable along the guide shafts, for converging the light beam emitted from the stationary optical system onto the optical recording medium;

a holding member containing the stationary optical system;

adjusting means for adjusting the holding member relative to the optical frame so as to render the flux of light from the stationary optical system to correspond to the optical axis of the movable optical system;

fixing means for fixing the holding member adjusted by the adjusting means, to the optical frame;

said fixing means including: screws; through holes formed in the holding member so that each of the through holes has a diameter which is greater than a diameter of each of the screws, the through holes permitting the screws to pass therethrough, respectively; and screw holes formed in the optical frame, the holding member being movable relative to the optical frame on the basis of a difference between the diameter of said each of the screws and the diameter of said each of the through holes.

2. The optical head according to claim 1, wherein the adjusting means has an adjusting surface formed on the guide shafts or the optical frame and extending perpendicular to the axes of the guide shafts; and a contact surface formed on the holding member and to be brought into contact with the adjusting surface, and the holding member is fixed to the adjusting surface by means of the fixing means.

3. The optical head according to claim 2, wherein the adjusting means has a hole formed in the holding member and receiving an end portion of the guide shaft, the hole having a dimension larger than the cross section of the guide shaft such that the holding member is movable relative to the guide shaft.

* * * * *